UNITED STATES PATENT OFFICE.

ARTHUR SAUER, OF ZWINGENBERG, GERMANY.

PROCESS OF PREPARING A BUTTERMILK SUBSTITUTE.

No. 846,697.     Specification of Letters Patent.     Patented March 12, 1907.

Application filed November 7, 1905. Serial No. 286,295.

*To all whom it may concern:*

Be it known that I, ARTHUR SAUER, a subject of the Grand Duke of Hesse, residing at Zwingenberg, Germany, have invented a new and useful Process of Preparing a Buttermilk Substitute of Constantly-Uniform Composition Ready for Use from Skimmed Milk, of which the following is a specification.

The skimmed milk, the by-product in the separation of cream, has till now found little use as food, although it contains a great amount of nourishment in the form of lactose and albumen. Apart from the frequently bad quality of the skimmed milk in commerce the cause for the neglect of its use is that the public do not relish the taste of the skimmed milk and the cheap preparations made from the latter.

My process has for its object the conversion of the skimmed milk under addition of ten per cent. milk into buttermilk of constant taste, composition, and great keeping quality, consequently to produce a refreshing food which is fully equivalent to a good buttermilk in its composition.

In the process of preparation the fat contained in the skimmed milk is first increased to the average amount in ordinary buttermilk, (0.5 per cent. fat,) by the addition of ten per cent. milk, (with 3.5 per cent. fat.) Then the mixture is pasteurized. It is of importance to heat up to at least 176° Fahrenheit and for a long time. After this the pasteurized milk is cooled to 77°–86° Fahrenheit, according to whether the acidification is to proceed slowly or quickly. Then there is added while stirring in a well-tinned vessel capable of being loosely closed by a wooden cover three per cent. of a freshly-prepared pure culture of bacteria to develop lactic acid and aroma. Acidification is allowed to proceed at the temperature of 77°–86° till the milk has obtained a degree of acidity of 3.5–3.6—that is, till ten parts of milk require 3.5–3.6 of one-tenth caustic-soda solution for neutralization. Then comes the most important part of my process. In order to avoid the clotting of the milk on further acidification and the loss of the already partly-formed agreeable fresh aroma, when the milk has reached the above degree of acidification it must at once be cooled to about 50°–64°. The most appropriate temperature has proved to be 57°. If the milk is allowed to acidulate slowly further at this temperature, when 7° of acidity are reached a fine even visible curdling occurs. The milk is allowed to stand for some hours longer for the purpose of still further developing the aroma. Then it has the agreeable fresh taste of buttermilk and does not deposit whey when my process is exactly followed. Very unsuitable for my process is skimmed milk pasteurized a short time, since the still-existing germs tend to thwart the fine curdling and the production of the agreeable aroma.

In order to show in which manner the skimmed milk is altered by the above-described process, the following analytic opposition may serve:

| Composition of the used skim-milk. | Composition of the product obtained by the process. |
|---|---|
| Fat .................... 0.20% | Fat .................... 0.50% |
| Proteids .............. 4.00% | Proteids .............. 4.00% |
| Lactose ............... 4.70% | Lactose ............... 4.00% |
| Salts .................. 0.70% | Salts .................. 0.70% |
| Lactic acid ........... 0.00% | Lactic acid ........... 0.67% |
| Aroma, insipid. | Aroma, refreshing, such as buttermilk. |

With respect to the above the product obtained by my process has the same composition as commercial average buttermilk.

As an example of my process I pasteurize two hundred parts of fresh skim-milk and twenty parts of milk containing 3.5 per cent. fat together ten minutes at 176°. The heating process is maintained at the above rate forty-five minutes. Then the milk is cooled to 77°–86° and mixed with three per cent. of the used milk mixture, in this case like 6.6 parts of a freshly-prepared pure culture of bacteria evolving lactic acid and aroma. This temperature is maintained till the degree of acidity of 3.5–3.6 is obtained. Now the milk is quickly cooled to 57° and left to acidity further, till the fine curdling begins. The milk is allowed to stand three to four hours at the same temperature, and then it is ready for use. At a temperature of 42° the milk retains its agreeable taste for at least four days.

Having now described my invention, what I claim is—

Process of preparing a buttermilk substitute consisting in pasteurizing two hundred parts of skim-milk and twenty parts of ordinary milk at 176°, cooling the mixture to 77°–86°, mixing with 6.6 parts of a pure culture of bacteria for developing lactic acid and aroma, maintaining this temperature till the degree of acidity of 3.5 to 3.6 is obtained, quickly cooling the milk to 57°, and allowing it to acidify further as set forth, as and for the purpose specified.

ARTHUR SAUER.

Witnesses:
 JEAN GRUND,
 CARL GRUND.